US010300996B2

(12) United States Patent
Arnold

(10) Patent No.: US 10,300,996 B2
(45) Date of Patent: May 28, 2019

(54) SELF-ADJUSTING DRIVE-ON FLOATING DOCK

(71) Applicant: Cellofoam North America, Inc., Conyers, GA (US)

(72) Inventor: Mark H. Arnold, Loganville, GA (US)

(73) Assignee: CELLOFOAM NORTH AMERICA, INC., Conyers, GA (US)

(*) Notice: Subject to any disclaimer, the term of this patent is extended or adjusted under 35 U.S.C. 154(b) by 0 days.

(21) Appl. No.: 15/918,250

(22) Filed: Mar. 12, 2018

(65) Prior Publication Data

US 2018/0257749 A1    Sep. 13, 2018

Related U.S. Application Data

(60) Provisional application No. 62/470,439, filed on Mar. 13, 2017.

(51) Int. Cl.
  *B63C 1/02* (2006.01)
  *B63B 35/44* (2006.01)
  *E02B 3/26* (2006.01)
  *E02B 3/20* (2006.01)

(52) U.S. Cl.
  CPC ............... *B63C 1/02* (2013.01); *B63B 35/44* (2013.01); *E02B 3/26* (2013.01); *E02B 3/20* (2013.01); *Y02A 30/36* (2018.01)

(58) Field of Classification Search
  CPC .......... B63B 35/00; B63B 35/40; B63B 35/44

USPC ..................... 114/45, 46, 259, 263
  See application file for complete search history.

(56) References Cited

U.S. PATENT DOCUMENTS

| 5,855,180 | A | 1/1999 | Masters |
| 6,006,687 | A | 12/1999 | Hillman et al. |
| 7,069,872 | B2 | 7/2006 | Ostreng et al. |
| 7,293,522 | B1 | 11/2007 | Elson |
| 7,481,175 | B2 | 1/2009 | Dickman |
| 8,069,807 | B2 * | 12/2011 | Kloster ............ B63C 3/02 114/263 |
| 2009/0044740 | A1 * | 2/2009 | Imel ............... B63C 3/02 114/263 |

* cited by examiner

*Primary Examiner* — Lars A Olson
(74) *Attorney, Agent, or Firm* — Thomas|Horstemeyer, LLP

(57) ABSTRACT

A self-adjusting, drive-on, floating dock for personal watercraft including a central float having a plurality of central float rollers to support the keel or bottom of the hull of a personal watercraft; and a plurality of side floats with attached side float arms having attached side float rollers that support the sides of the hull of a personal watercraft; and in which at least one of the side floats is attached to the central float in such a manner to allow it to float independently of the center float, but is restrained from drifting away from said central float; and the independent buoyant forces created by both the central float and the plurality of side floats together support the hull of a personal watercraft.

20 Claims, 7 Drawing Sheets

SELF-ADJUSTING DRIVE-ON FLOATING DOCK

CROSS REFERENCE TO RELATED APPLICATION

This application claims priority to, and the benefit of, U.S. provisional application entitled "SELF-ADJUSTING DRIVE-ON FLOATING DOCK" having Ser. No. 62/470,439, filed Mar. 13, 2017, which is hereby incorporated by reference in its entirety.

TECHNICAL FIELD

This disclosure relates to a method and system for a self-adjusting drive-on floating dock. Particularly, this disclosure concerns a floating dock able to accommodate docking and storage of personal watercraft, small boats, and other small marine vessels with a variety of hull configurations on the same dock.

BACKGROUND

Drive-on docks are becoming increasingly popular for users of personal watercraft. Such systems allow a boat to be stored out of the way of floating, or partially submerged, windblown or wave driven debris that could impact and damage the boat's hull or motor. Drive-on docks also serve to minimize buildup of algae, barnacles, or other plant or animal life on the portion of the boat below the water line. Conventional drive-on docks, however, suffer from a number of disadvantages discussed in more detail below that the present dock is designed to overcome.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
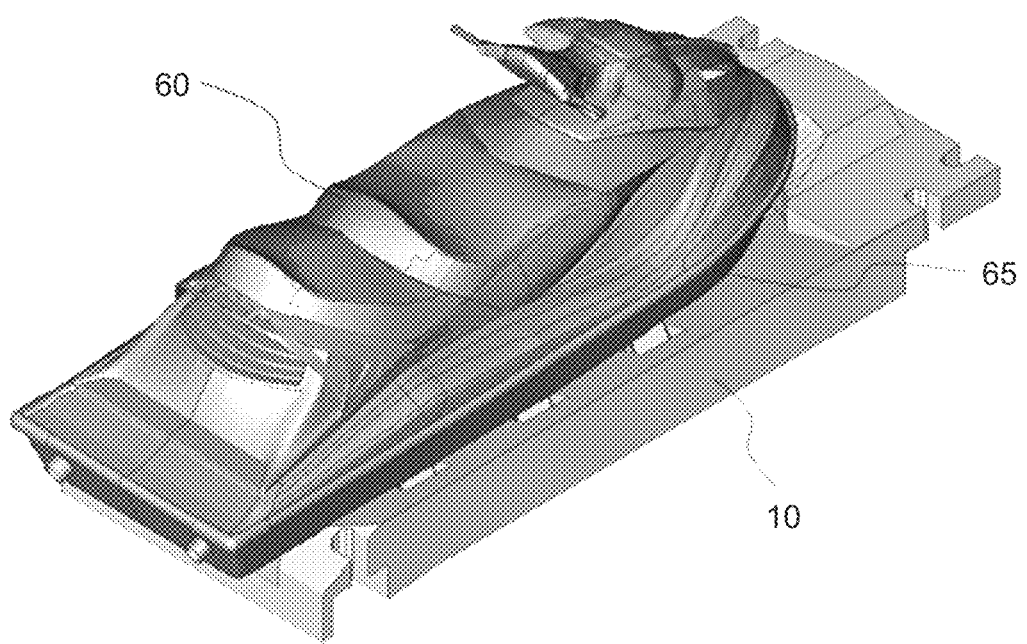
FIG. 1 depicts a personal watercraft berthed upon an embodiment of the present disclosure.

Described below are various embodiments of the present system and method for a self-adjusting drive-on floating dock. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

This disclosure relates to a method and system for a self-adjusting drive-on floating dock and storage of personal watercraft, small boats, and other small marine vessels. Particularly, this disclosure concerns a floating dock able to accommodate a multitude of different hull configurations on the same dock without the need to manually adjust the configuration of dock's rollers, if even adjustable, between the drive-on docking of different personal watercraft hull shapes and designs. More particularly, in one or more aspects this disclosure provides a method and system of accommodating the drive-on docking of personal watercraft in such a way as to utilize the buoyancy of a central float to support the personal watercraft's keel or bottom of its hull as well as the buoyancies of a plurality of side floats which independently support the sides of the personal watercraft's hull, self-adjusting to the unique shape of the hull, thereby allowing support of a wide variety of vessel shapes and models.

Conventional drive-on docks for personal watercraft utilize various means to support the personal watercraft once berthed on the dock. These means are generally: (1) merely the shape of the dock itself, often manufactured with a "V" or hull-shaped cavity; (2) a series of rollers that are not adjustable; and/or (3) a series of rollers whose location may be moved through mechanical adjustment. The latter are becoming more popular with recent dock designs as they allow for the dock to accommodate a wider range of personal watercraft hull designs.

Conventional drive-on docks suffer, however, from the disadvantage that they generally require mechanically pre-adjusting the location of the rollers, by fitting them into optional slots or moving arm extensions holding rollers, to suit the unique shape of the watercraft's hull to be supported. This adjustment effectively tailors such docks to one particular hull shape and renders the docks non-ideally configured or even unsuitable for use by other craft without re-adjustment. Unless re-adjusted, such drive-on docks will not support certain shaped hulls in an ideal, near vertical position. Instead, many drive-on docks for personal watercraft inadequately support the hull, especially laterally, which can cause the docked boat to tilt at a large angle, even to the degree of tilting so far as to rest one side of its hull on the dock. Such drive-on dockings may be disconcerting or even hazardous for the watercraft drivers and passengers, as well as make loading and unloading difficult. Further, insufficient support of the personal watercraft vehicle during drive-on docking or while berthed can cause damage to the hull.

The problem of drive-on docks not supporting many different hull shapes has been exacerbated over the past few years by the proliferation of new and different personal watercraft hull shapes and sizes that have been brought to market. Many consumers and rental businesses now own multiple types or brands of personal watercraft and for convenience often dedicate a particularly adjusted, drive-on dock for each specific watercraft type.

In one or more aspects, the present self-adjusting drive-on floating dock greatly reduces the need for dedicating a particularly adjusted drive-on dock for each specific watercraft by providing a dock that automatically self-adjusts to suit the shape of various hulls and hence minimizes or even requires no adjustment between use by differing personal watercraft. The present disclosure introduces the innovative concept of providing a plurality of buoyant sections that float independently of each other and independently support portions of the hull, and are thereby able to self-adjust to the shape of different personal watercraft hulls. There is enough buoyancy in the central float to be able to support a large portion of the gross weight of the personal watercraft, including driver, passengers, and cargo, transmitted through its keel or bottom, with part of the boat's gross weight also being borne by the additional buoyant components arranged to support the side of the boat's hull in such a manner as to keep it approximately upright on the dock.

The present self-adjusting drive-on floating dock eliminates the need to readjust hardware on drive-on docks to support the use of different hull shapes. The present self-adjusting drive-on floating dock can, thus, be used for the drive-on docking and storage of a wide variety of personal watercraft. Some examples of personal watercraft include: Jet Ski®, Sea-Doo®, WaveRunner®, some fishing boats, and some pleasure boats.

In one or more aspects, the method and the system of a self-adjusting drive-on floating dock center around the innovative concept of providing a plurality of buoyant sections that float independently of each other and independently support portions of the hull of a personal watercraft, and are thereby able to self-adjust to the shape of different personal watercraft hulls. There is enough buoyancy in the central float to be able to support a large portion of the gross weight of the watercraft with part of the load also being borne by additional buoyant components, or one or more side floats, arranged such that they support the sides of the hull in such a manner as to keep the watercraft approximately upright on the dock.

In an embodiment, a floating dock system is provided for a personal watercraft. The floating dock system can comprise: a main floating platform, comprising: a center docking section and at least one roller rotationally secured about an axis to the main floating platform, wherein the axis of the at least one roller is positioned across a longitudinal centerline of the main floating platform; and at least two side portions, at least one of the side portions positioned opposite at least one other side portion about the longitudinal centerline of the main floating platform, at least one side portion having at least one opening between a top side of the main floating platform and a bottom side of the main floating platform; at least one buoyant side member in one of the at least two side portions which is configured to float independently of the main floating platform, wherein the at least one buoyant side member comprises at least one pair of arms with a side roller rotationally secured between each of the at least one pair of arms; and wherein the at least one pair of arms of the at least one buoyant side members is positioned within the at least one opening of the at least two side portions.

In an embodiment, a method for docking a personal watercraft is provided. The method can comprise: a) providing a floating dock system for the personal watercraft, the floating dock system including a main floating platform, the main floating platform having a center docking section and at least one roller rotationally secured about an axis to the main floating platform, wherein the axis of the at least one roller is positioned across a longitudinal centerline of the main floating platform, and at least two side portions, at least one of the side portions positioned opposite at least one other side portion about the longitudinal centerline of the main floating platform, at least one side portion having at least one opening between a top side of the main floating platform and a bottom side of the main floating platform, at least one buoyant side member in one of the at least two side portions which is configured to float independently of the main floating platform, wherein the at least one buoyant side member comprises at least one pair of arms with a side roller rotationally secured between each of the at least one pair of arms and the at least one pair of arms of the at least one buoyant side members is positioned within the at least one opening of the at least two side portions; and b) driving the personal watercraft up onto the main floating platform such that a centerline of the hull of the personal watercraft is driven up onto the center docking section and wherein the at least one pair of arms of the independently floating side member allows the dock to self-adjust to the shape of the hull of the personal watercraft to maintain the personal watercraft upright on the dock.

In any one or more aspects of the floating dock system or the method for docking a personal watercraft or both, the at least one side portion can have at least one cavity in the bottom side thereof and the at least one buoyant side member can be positioned beneath the main floating platform and at least partially within the cavity of the at least one side portion with at least a portion of the at least one pair of arms protruding through the at least one opening in the cavity. The at least one roller can be positioned across the longitudinal centerline. The at least one roller positioned across the longitudinal centerline can be configured to guide a hull bottom of the personal watercraft onto the floating dock system. The at least one roller positioned across the longitudinal centerline can be positioned orthogonally across the longitudinal centerline.

The center docking section can be configured with a trough running along the longitudinal centerline of the center docking section, with the at least one roller positioned across the centerline is positioned within the trough. The trough can be configured to receive a keel of the hull bottom of the personal watercraft. The at least one buoyant side member can be arranged to adjustably support a portion of a hull of the personal watercraft to hold it in a substantially upright position with the side rollers in contact with at least a portion of the hull of the personal watercraft. The center docking section can further comprise at least one self-centering roller positioned across the centerline of the main floating platform and near an end of the floating dock system. The at least one self-centering roller can be positioned orthogonally across the centerline. The at least one roller of the center docking section can be a self-centering roller.

In any one or more aspects the at least one buoyant side member can be configured to float independently of the main floating platform. At least two buoyant side members can be provided, at least one buoyant side member provided in each side portion opposed from each other about the centerline of the center docking section, the buoyant side members configured to float independently of the main floating platform, wherein each of the at least two buoyant side members comprises at least one pair of arms with a side roller rotationally secured between each of the at least one pair of arms In an embodiment, a self-adjusting, drive-on, floating dock is provided. The self-adjusting drive-on, floating dock can comprise: a central float comprising a plurality of central float rollers to support at least a bottom portion of a hull of a personal watercraft; and a plurality of side floats to support at least a portion of opposed sides of the hull of a personal watercraft; wherein each of the plurality of side floats comprise a plurality of side float arms and a plurality of side float rollers; wherein at least one of the plurality of side floats is configured to float independently and is detachably constrained with respect to the central float; and wherein independent buoyant forces created by both the central float and the at least one of the plurality of side floats configured to float independently together support the hull of a personal watercraft.

In an embodiment a method for docking a personal watercraft on a self-adjusting, drive-on, floating dock is provided. The method can comprise a) providing a self-adjusting, drive-on, floating dock, the dock including a central float comprising a plurality of central float rollers to support at least a bottom portion of a hull of the personal watercraft, and a plurality of side floats to support at least a portion of opposed sides of the hull of a personal watercraft, wherein each of the plurality of side floats comprise a plurality of side float arms and a plurality of side float rollers and at least one of the plurality of side floats is configured to float independently of the central float and is detachably constrained with respect to the central float; and b) driving the personal watercraft up onto the central float, wherein independent buoyant forces are created against the hull of the personal watercraft by both the central float and the at least one of the plurality of side floats configured to float independently of the central float that together support the personal watercraft substantially upright on the dock.

In any one or more aspects of the self-adjusting, drive-on, floating dock or the method of docking a personal watercraft on the dock or both, the central float can further comprise at least one hollow cavity; wherein the at least one side float is contained in the at least one hollow cavity of the central float; and the side float arms of the at least one side float extend through openings in the central float and employ attached side float rollers to assist in supporting the hull of a personal watercraft. The at least one side float can create restoring buoyant forces that automatically self-adjust the height of the side float rollers to contact and support differently shaped personal watercraft hulls. The at least one side float can create restoring buoyant forces to automatically aid in self-righting a side-tilting personal watercraft. The one or more self-centering rollers can be incorporated along a longitudinal centerline from the rear end to the forward end of the central float, at least one of the one or more self-centering rollers positioned near an end of a dock where the personal watercraft initially drives up onto the dock while berthing.

In any one or more aspects, the self-adjusting drive-on floating dock can combine a main floating platform including a central float with a plurality of rollers that support the keel or bottom hull of a personal watercraft and a plurality of buoyant side members or side floats with a plurality of arms holding a plurality of rollers that support the sides of the personal watercraft hull. In an aspect, at least two side floats can be provided on opposed sides (side portions) of the central float. The plurality of side floats can be configured so they float independently of the central float.

In an embodiment, a plurality of side floats can be incorporated inside one or more hollow cavities within side portions of the central float of the dock, in such a manner that the arms and attached rollers of the side floats pass through openings in the side portions of central float to support the hull of the personal watercraft. The side floats can be constrained from moving away from the central float. Another embodiment incorporates one or more self-centering rollers along the centerline of the central float of the dock. The side floats can be configured to be movable within the hollow cavities within the central float such that they float within the cavities independently of the central float.

In any one or more aspects, a bow stop can be incorporated as a part of the central float of the main floating platform of the dock to assist in stopping a personal watercraft if driven too vigorously onto the dock. An anchoring point can be incorporated with the dock, for example with the bow stop, for securing the personal watercraft while berthed, and/or a winching device can be attached to the main floating platform, for example positioned at the bow stop. The main floating platform for example the bow or bow stop can include a storage compartment, such as for possibly for storing boating gear or safety equipment, such as a fire extinguisher.

In any one or more embodiments, the central float, the side portions and/or the plurality of side floats of the dock are manufactured of polyethylene plastic using a rotational molding process. The central float, the side portions and/or side floats can be filled with expanded plastic polymer foam, such as polystyrene foam or expanded polyurethane foam, with an external skin so that positive buoyancy is maintained even if a skin of one or more of the floats is punctured or breached. In an embodiment, a side float and its associated side float arms can each be manufactured as a single part. In any one or more aspects, different buoyancies can be provided for different sections or portions of the dock. Different buoyancies can be provided for the central float, the side portions and/or side floats. For example, the side portions of the main floating platform can be made of a material having a higher buoyancy than the central docking section or central float of the dock, or the one or more side floats can be made of a material having a higher buoyancy than the central float or the side portions to aid in maintaining the dock upright and level. A higher buoyancy can be provided, for example, by using a less dense foam material for one section as compared to another section, such as using a less dense foam for the one or more side floats than for the central float or side portions.

Referring now in more detail to the drawings, in which like numerals indicate like parts through the several views, FIG. 1 depicts an isometric view of a personal watercraft 60 berthed upon an embodiment of a self-adjusting, drive-on floating dock 10 for personal watercraft of the present disclosure, the hull 65 of the personal watercraft in engagement with the dock 10.

Figure 2:
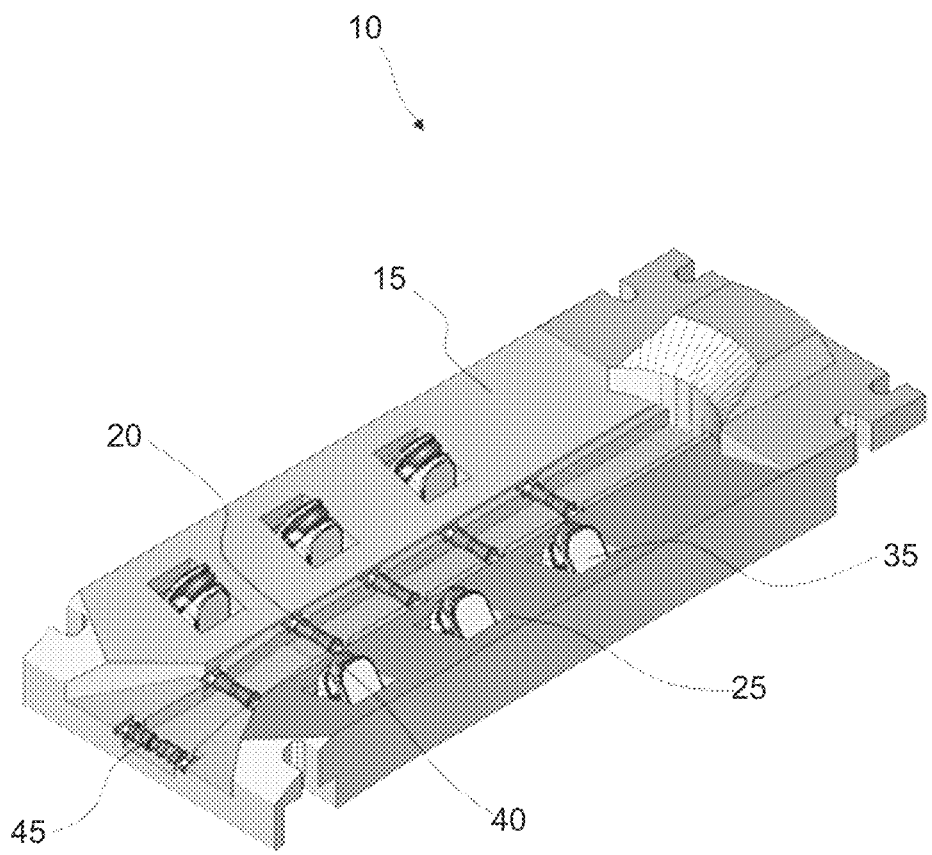
FIG. 2 is an isometric view of an embodiment of the present disclosure.

Turning now to FIG. 2, shown is an isometric view of one embodiment of a self-adjusting, drive-on floating dock 10 for personal watercraft. The main floating platform of the dock 10 includes a central float 15, one or more central float rollers 20 for the personal watercraft hull bottom or keel to travel and rest upon, openings 25 in the central float through which one or more side float arms 35 protrude from a cavity 55 (see, e.g., FIGS. 5A and 5B and FIG. 6) of the central float, and a self-centering roller 45 at one end of the dock 10, which assists in centering the personal watercraft 60, for example as it is driven on top of the dock. In an aspect, a plurality of central float rollers 20 can be provided as depicted. In another aspect, two or more buoyant side members or side floats 30 (see, e.g., FIG. 3) can be provided each having one or more side float rollers 40. The buoyant side members or side floats 30 can be disposed on opposed sides of the central float 15 with the central float rollers 20 disposed in between the opposed side floats 30.

Figure 3:
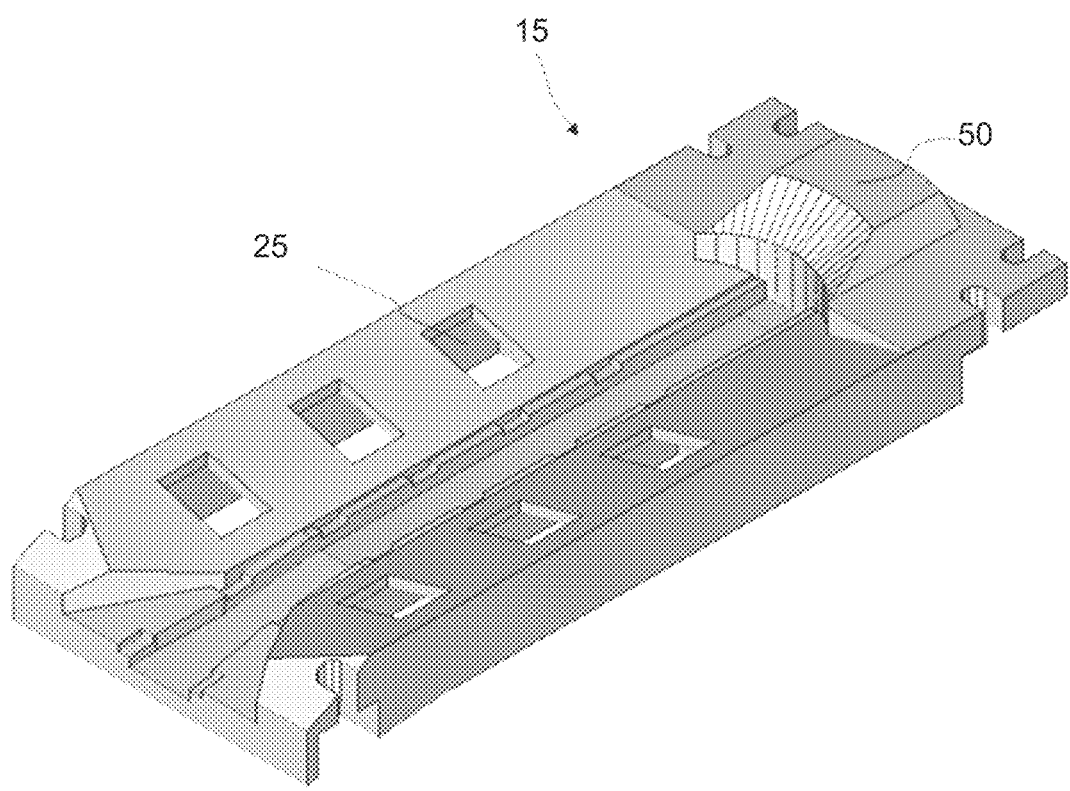
FIG. 3 depicts an isometric view of the central float portion of an embodiment of the present disclosure.

Continuing with FIG. 3, shown is an isometric view of one embodiment of the central float 15. The central float 15 can include, among other features, a plurality of the openings 25, and a bow stop 50. The bow stop 50 can assist in stopping the personal watercraft 60 if driven too vigorously onto the dock as well as providing an anchoring point for securing the personal watercraft while berthed. In some aspects, a winching device (not shown) can also be attached to the bow stop 50 to assist in pulling heavier boats out of the water.

Figure 4:
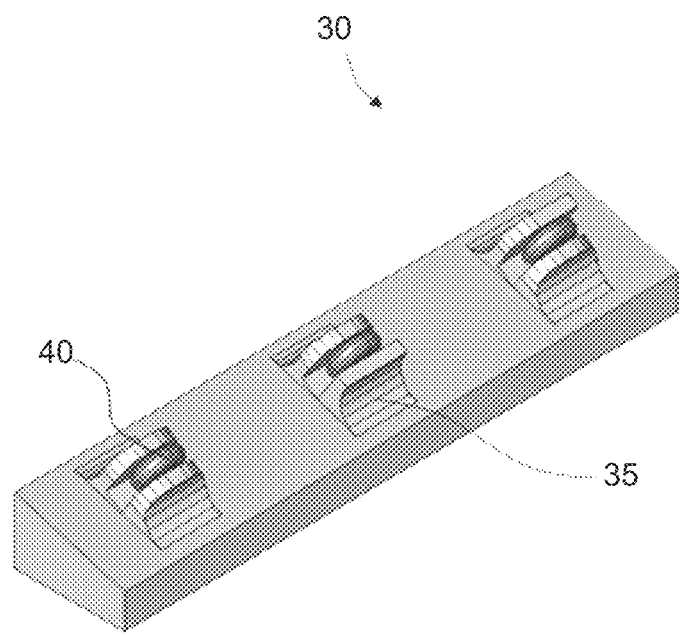
FIG. 4 shows an isometric view of one of a plurality of side floats for an embodiment of the present disclosure.

Next, FIG. 4 depicts an isometric view of one embodiment of a side float 30. The side float includes one or a plurality of side float rollers 40 each attached to one or a plurality of side float arms 35. The side float arms 35 can be either manufactured separately from the side floats 30 and then attached to them or manufactured as a single part. A side float 30 can be disposed either on one side or both sides of the central float.

Figure 5A:
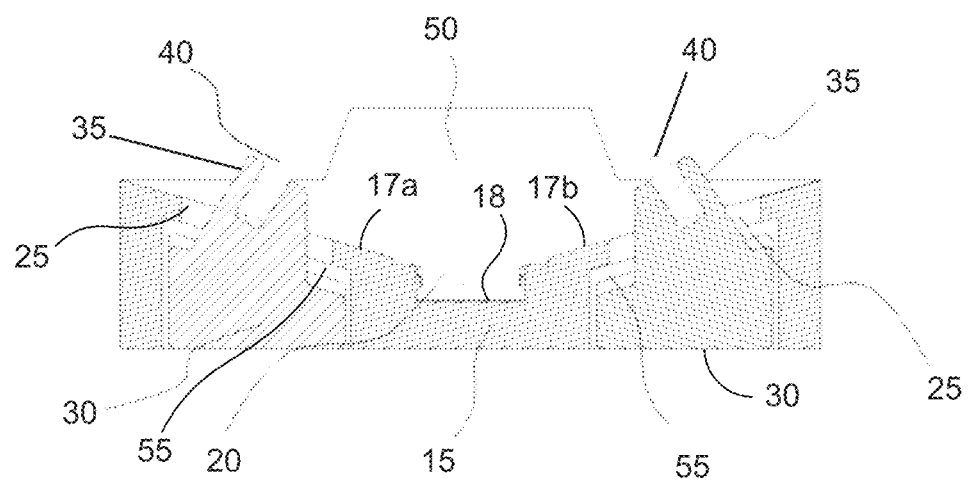
FIG. 5A illustrates a cross-section of an embodiment of the present disclosure.
Figure 5B:
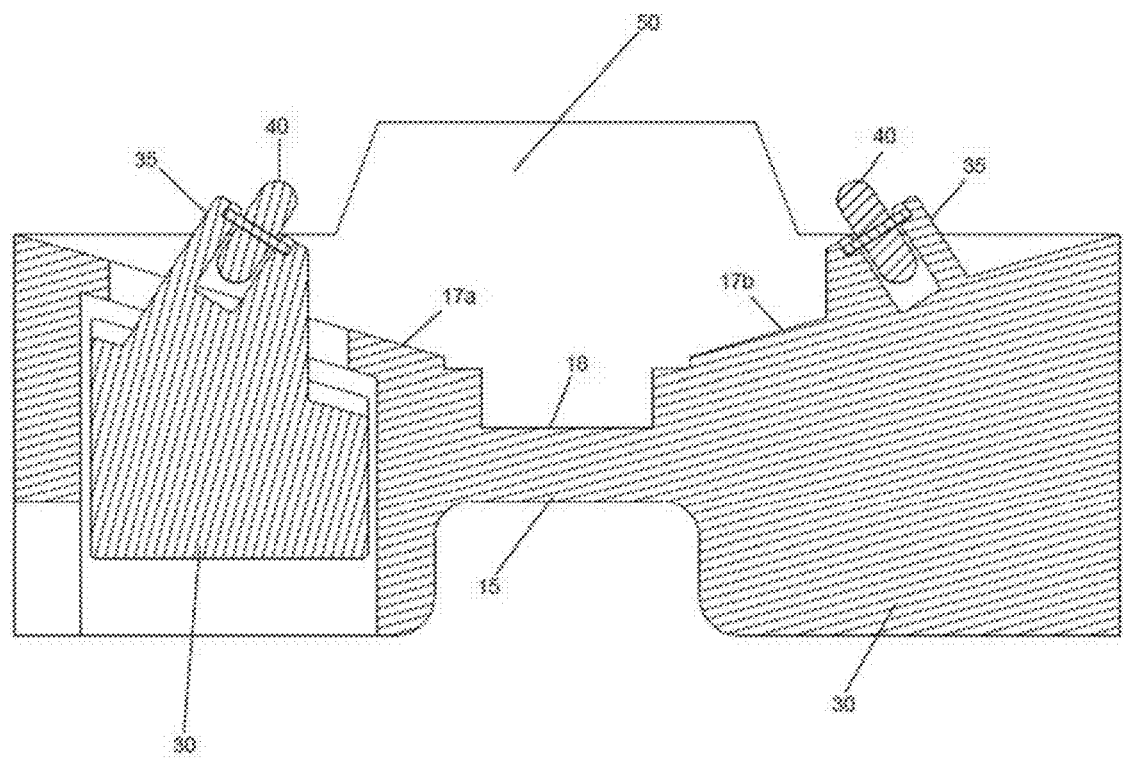
FIG. 5B illustrates a cross-section of another embodiment of the present disclosure.

FIG. 5A is a cross-sectional view of an embodiment of the self-adjusting, drive-on floating dock 10 for personal watercraft. The dock 10 includes a central float section 15. The upper surfaces 17a, 17b form a shallow v-shape along a majority of its length in the longitudinal direction from the back to the front of the central float section 15. Centrally disposed between the sides of the central float 15 and running along its longitudinal length from front to back is a trough 18 within which the one or more central float rollers 20 can be disposed. The self-centering roller 45 can be disposed at the back end of the central float section 15 within the rear opening of the trough 18. The trough 18 can terminate towards the front end of the dock at the bow stop 50. The upper surfaces 17a, 17b of the central float 15 diverge upwardly and away from the trough 18 towards the outer side periphery of the central float 15, thereby forming side portions of the dock and forming the shallow v-shape cross-section. At least one of side portions includes one or more openings 25. In an aspect, both upper surfaces 17a, 17b of the side portions include one or more openings 25.

The dock 10 can include at least one side float 30 contained within a hollow cavity 55 in a side portion of the central float 15, with the side float 30 having one or more side float arms 35 protruding through one or more openings 25 in the side portion of the central float 15. While the at least one side float 30 is contained within a hollow cavity 55 in the central float 15, the hollow cavity 55 is large enough to allow the at least one side float 30 to freely move a significant distance up and down independent of the movement of the central float 15. This allows the at least one side float 30 to generate a range of buoyant forces and movement to react upon the forces exerted by the portion of the personal watercraft hull 65 resting on the side float rollers 40. Further, the at least one side float 30 can act independently of the central float section and react to dynamic and static buoyant forces and forces exerted from the hull of the personal watercraft 60 due to gravity, wave motion, etc.

Because the buoyancy forces generated by the at least one side float 30 is independent of those of the central float 15, the at least one side float 30 can effectively self-adjust to the hull shape of each type of personal watercraft 60 encountered. When a typical personal watercraft 60 is driven on top of the central float 15, the weight of the personal watercraft 60 acts against the buoyancy force generated by the volume of the central float 15 that resides below the water level, and forces the central float 15 to sink lower in the water. This can lower the hull closer to the water line and engage the side float rollers 40 which serve to help support the weight of the personal watercraft 60. If a personal watercraft 60 starts to tilt on its side from the vertical, the added weight of the hull onto the impacted side float rollers 40 forces their associated attached at least one side float 30 deeper into the water, thus generating larger buoyant forces that offset the tilt force and restore the personal watercraft 60 to a more upright position.

While the embodiment of FIG. 5A depicts a slide side float 30 moveably positioned within a cavity 55 in each side portion of the central float 15 disposed in an opposed relationship about trough 18, one skilled in the art will recognize that one or the other of the side floats 30 can be fixed against movement in relation to the central float 15 while the opposed side float 30 can be allowed to move independently of the central float 15 within a cavity 55. Alternatively, one of the side floats can be formed as a unitary component of a side portion of the central float, while the opposed side float is allowed to move independently with respect to its associated side portion of the central float, as depicted for example in FIG. 5B.

Figure 6:
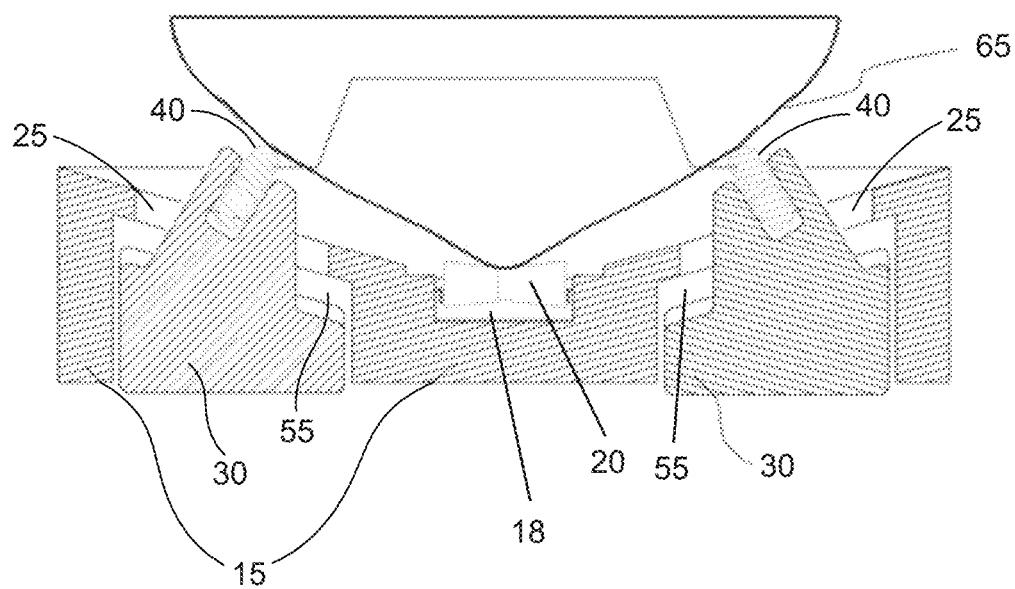
FIG. 6 illustrates a cross-section of an embodiment of the present disclosure, with a personal watercraft hull berthed on it.

Next, FIG. 6 is a cross-sectional drawing illustrating an embodiment of the self-adjusting, drive-on floating dock 10 for personal watercraft 65, showing the central float 15, a plurality of side floats 30, as well as a cross-sectional drawing of a personal watercraft hull 65 berthed on the dock. This illustration shows how the personal watercraft hull 65 can be supported by both of the opposed side float rollers 40, and thus indirectly the side float arms 35 and the side floats 30 themselves, as well as by the central float rollers 20 and thus indirectly by the central float 15 itself. As noted above, one or both of the side floats 30 can be allowed to move independently of its associated side portion of the central float.

One or both of the cavities 55 in the central float 15 can be designed to be large enough to allow the side floats 30 to move up and down in relation to the central float 15, thus accommodating dramatically different shaped personal watercraft hulls 65. The cavities 55 in the central float 15 straps or other devices (not shown) can be employed to prevent the side floats 30 from separating from central float 15.

While FIGS. 1 through 6 depict embodiments of specific shapes of the central float 15 and side floats 30, those well versed in the art understand many variations in float geometries can be used in connection with the present dock 10 without departing from its novel concept. The embodiments shown in FIGS. 1-6 employ a single central float 15 and two independent, opposed side floats 30. However, in other aspects a larger number of independent side floats 30 can be utilized, or only one independent side float 30 can be utilized as discussed above. Likewise, variations in numbers and types of side float arms 35 and associated side float rollers 40, incorporated into each side float 30 can be employed. Finally, numerous variations exist in both side float arm 35 geometries as well as the effective angle of their associated side float rollers 40 to mate with the various hulls of personal watercraft 60.

In another embodiment, cavities 55 in the central float 15 are employed that constrain the movement of the side floats 30 and attached side float arms 35 and side float rollers 40. These cavities keep the side floats from drifting away. However, cavities 55 in the central float 15 are not necessary and those well versed in the art understand many alternatives exist for attaching the side floats 30 to the central float 15 without the use of said cavities, but still permitting movement of at least one, if not all, of the side floats 30 independently in relation to the central float 15.

Another embodiment can incorporate one or more self-centering rollers 45 positioned on the longitudinal centerline of the central float 15, near the end of the dock 10 where the personal watercraft 60 first drives onto the dock while berthing.

Another embodiment can incorporate a bow stop 50 to assist in stopping the personal watercraft 60 if driven too vigorously onto the dock as well as providing an anchoring point for securing the personal watercraft while berthed. In some aspects, a winching device may also be attached to the bow stop 50 to assist in pulling larger crafts out of the water. In some aspects, the bow stop 50 can be designed to be large enough to include a storage capability with a door (not shown) to allow storage of boat gear or safety equipment such as a fire extinguisher.

In another embodiment, the central float 15 and the plurality of side floats 30 can be manufactured of polyethylene plastic using a rotational molding process. In various aspects, the hollow central float 15 and the hollow side floats 30 can be filled with expanded plastic polymer foam, such as expanded polystyrene foam or expanded polyurethane foam, with an external skin, such as a plastic skin, so that positive buoyancy is maintained even if a plastic skin of the floats is punctured or breached. In some aspects, the side floats 30 and side float arms 35 are manufactured as a single part.

In some aspects, different buoyancies can be provided for different sections or portions of the dock. Different buoyancies can be provided for the central float, the side portions and/or side floats. For example, the side portions of the main floating platform can be made of a material having a higher buoyancy than the central docking section or central float of the dock, or the one or more side floats can be made of a material having a higher buoyancy than the central float or the side portions to aid in maintaining the dock upright and level. A higher buoyancy can be provided, for example, by using a less dense foam material for one section as compared to another section, such as using a less dense foam for the one or more side floats than for the central float or side portions.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

LIST OF REFERENCE CHARACTERS

10 Self-adjusting, drive-on floating dock for personal watercraft (floating dock system)
15 Central float (main floating platform)
17a, 17b Upper surfaces of central float
18 Trough
20 Central float rollers (rollers)
25 Opening in the central float
30 Side float (buoyant side members)
35 Side float arm (pair of arms)
40 Side float rollers (side rollers)
45 Self-centering roller
50 Bow stop
55 Cavity in the central float (cavity of a side section of main floating platform)
60 Personal watercraft
65 Personal watercraft hull Therefore, the following is claimed:

1. A floating dock system for a personal watercraft, comprising:
  a main floating platform, comprising:
    a center docking section and at least one roller rotationally secured about an axis to the main floating platform, wherein the axis of the at least one roller is positioned across a longitudinal centerline of the main floating platform; and
    at least two side portions, at least one of the side portions positioned opposite at least one other side portion about the longitudinal centerline of the main floating platform, at least one side portion having at least one opening between a top side of the main floating platform and a bottom side of the main floating platform;
    at least one buoyant side member in one of the at least two side portions which is configured to float independently of the main floating platform, wherein the at least one buoyant side member comprises at least one pair of arms with a side roller rotationally secured between each of the at least one pair of arms; and
    wherein the at least one pair of arms of the at least one buoyant side members is positioned within the at least one opening of the at least two side portions.

2. The floating dock system of claim 1, wherein the at least one side portion has at least one cavity in the bottom side thereof and the at least one buoyant side member is positioned beneath the main floating platform and at least partially within the cavity of the at least one side portion with at least a portion of the at least one pair of arms protruding through the at least one opening in the cavity.

3. The floating dock system of claim 1, wherein the at least one roller positioned across the longitudinal centerline is configured to guide a hull bottom of the personal watercraft onto the floating dock system.

4. The floating dock system of claim 3, wherein the center docking section is configured with a trough running along the longitudinal centerline of the center docking section, and the at least one roller is positioned across the centerline within the trough, the trough configured to receive a keel of the hull bottom of the personal watercraft.

5. The floating dock system of claim 1, wherein the at least one buoyant side member is arranged to adjustably support a portion of a hull of the personal watercraft to hold it in a substantially upright position with the side rollers in contact with at least a portion of the hull of the personal watercraft.

6. The floating dock system of claim 1, wherein the center docking section further comprises at least one self-centering roller positioned across the centerline of the main floating platform and near an end of the floating dock system.

7. The floating dock system of claim 1, wherein the at least one roller of the center docking section is a self-centering roller.

8. The floating dock system of claim 1, wherein the main floating platform further comprises one or more of a bow stop configured to arrest forward motion of the personal watercraft upon docking, a bow stop comprising in anchoring point, a winching device attached to the main floating platform, or a storage compartment.

9. The floating dock system of claim 1, wherein at least one of the main floating platform or the at least one buoyant side member is formed of a polyethylene plastic using a rotational molding process.

10. The floating dock system of claim 1, wherein at least one of the main floating platform or the at least one buoyant side member is filled with an expanded plastic polymer foam.

11. The floating dock system of claim 1, wherein the at least one buoyant side member is formed with the at least one pair of arms in a single unit.

12. The floating dock system of claim 1, wherein the at least one buoyant side member is configured to float independently of the main floating platform.

13. The floating dock system of claim 1, wherein at least two buoyant side members are provided, at least one buoyant side member provided in each side portion opposed from each other about the centerline of the center docking section, the buoyant side members configured to float independently of the main floating platform, wherein each of the at least two buoyant side members comprises at least one pair of arms with a side roller rotationally secured between each of the at least one pair of arms.

14. A self-adjusting, drive-on, floating dock, comprising:
  a central float comprising a plurality of central float rollers to support at least a bottom portion of a hull of a personal watercraft; and
  a plurality of side floats to support at least a portion of opposed sides of the hull of a personal watercraft;
  wherein each of the plurality of side floats comprise a plurality of side float arms and a plurality of side float rollers;
  wherein at least one of the plurality of side floats is configured to float independently and is detachably constrained with respect to the central float; and
  wherein independent buoyant forces created by both the central float and the at least one of the plurality of side floats configured to float independently together support the hull of a personal watercraft.

15. The self-adjusting, drive-on, floating dock of claim 14, wherein:
  the central float further comprises at least one hollow cavity;
  the at least one side float is contained in the at least one hollow cavity of the central float; and
  the side float arms of the at least one side float extend through openings in the central float and employ attached side float rollers to assist in supporting the hull of a personal watercraft.

16. The self-adjusting, drive-on, floating dock of claim 14, wherein:
  the at least one side float creates restoring buoyant forces that automatically self-adjust the height of the side float rollers to contact and support differently shaped personal watercraft hulls, or creates restoring buoyant forces to automatically aid in self-righting a side-tilting personal watercraft, or both.

17. The self-adjusting, drive-on, floating dock of claim 14, wherein:
  one or more self-centering rollers are incorporated along a longitudinal centerline from the rear end to the forward end of the central float, at least one of the one or more self-centering rollers positioned near an end of a dock where the personal watercraft initially drives up onto the dock while berthing.

18. The self-adjusting, drive-on, floating dock of claim 14, wherein:
  the central float includes one or more of a bow stop to assist in stopping the personal watercraft if driven too vigorously onto the dock as well as to provide an anchoring point for securing the personal watercraft while berthed a winching device attached to a bow stop to assist in pulling heavier boats out of the water, or a storage cavity having a door incorporated into a bow stop for storage of boat gear or safety equipment.

19. The self-adjusting, drive-on, floating dock of claim 14, wherein:
  either or both the central float and the plurality of side floats are manufactured of polyethylene using a rotational molding process or are filled with an expanded plastic polymer foam so that positive buoyancy is maintained even if one or more of the floats is punctured or breached.

20. The self-adjusting, drive-on, floating dock of claim 14, wherein:
  each side float and its associated side float arms are manufactured as a single part.

* * * * *